United States Patent
Fuller et al.

(10) Patent No.: US 9,766,940 B2
(45) Date of Patent: Sep. 19, 2017

(54) ENABLING DYNAMIC JOB CONFIGURATION IN MAPREDUCE

(71) Applicant: International Business Machines Corporation, Armonk, NY (US)

(72) Inventors: Nicholas C. Fuller, North Hills, NY (US); Minkyong Kim, Scarsdale, NY (US); Min Li, Blacksburg, VA (US); Shicong Meng, Elmsford, NY (US); Jian Tan, Wappingers Falls, NY (US); Liangzhao Zeng, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 14/176,679

(22) Filed: Feb. 10, 2014

(65) Prior Publication Data

US 2015/0227392 A1    Aug. 13, 2015

(51) Int. Cl.
| | |
|---|---|
| *G06F 9/50* | (2006.01) |
| *G06F 9/46* | (2006.01) |
| *G06F 9/48* | (2006.01) |
| *G06F 11/34* | (2006.01) |

(52) U.S. Cl.
CPC ............ *G06F 9/5066* (2013.01); *G06F 9/466* (2013.01); *G06F 9/4881* (2013.01); *G06F 11/34* (2013.01)

(58) Field of Classification Search
CPC ...... G06F 9/5066; G06F 11/34; G06F 9/4881; G06F 9/466
See application file for complete search history.

(56) References Cited

U.S. PATENT DOCUMENTS

| | | | |
|---|---|---|---|
| 8,447,721 B2 | 5/2013 | Eshleman et al. | |
| 9,069,610 B2* | 6/2015 | Chakravorty | ............. G06F 9/50 |
| 9,141,430 B2* | 9/2015 | Cherkasova | .......... G06F 9/5038 |
| 2010/0281166 A1* | 11/2010 | Buyya | .................. G06F 9/5072 709/226 |
| 2011/0061057 A1* | 3/2011 | Harris | ................... G06F 9/5072 718/104 |
| 2011/0213655 A1 | 9/2011 | Henkin et al. | |

(Continued)

OTHER PUBLICATIONS

Keahey et al. Sky Computing, Internet Computing, IEEE (vol. 13, Issue:5) Date of Publication: Sep.-Oct. 2009.

(Continued)

*Primary Examiner* — Benjamin Wu
(74) *Attorney, Agent, or Firm* — Ryan, Mason & Lewis, LLP

(57) ABSTRACT

Methods, systems, and articles of manufacture for enabling dynamic task-level configuration in MapReduce are provided herein. A method includes generating a first set of configurations for a currently executing MapReduce job, wherein said set of configurations comprises job-level configurations and task-level configurations; dynamically modifying configurations associated with a mapper component and/or a reducer component associated with at least one ongoing map task and/or ongoing reduce task of the MapReduce job based on the generated first set of configurations; and deploying said first set of configurations to the mapper component and/or the reducer component associated with the MapReduce job.

18 Claims, 3 Drawing Sheets

(56) References Cited

U.S. PATENT DOCUMENTS

| | | | |
|---|---|---|---|
| 2011/0225584 A1* | 9/2011 | Andrade | G06F 11/3447 718/100 |
| 2012/0072656 A1 | 3/2012 | Archak et al. | |
| 2012/0266159 A1 | 10/2012 | Risbood et al. | |
| 2012/0284727 A1 | 11/2012 | Kodialam et al. | |
| 2012/0291041 A1* | 11/2012 | Cipar | G06F 9/5011 718/104 |
| 2013/0073724 A1* | 3/2013 | Parashar | G06F 9/5072 709/224 |
| 2013/0179894 A1* | 7/2013 | Calder | G06F 9/5027 718/104 |
| 2013/0318538 A1* | 11/2013 | Verma | G06F 9/50 718/104 |
| 2014/0026147 A1* | 1/2014 | Cherkasova | G06F 9/505 718/105 |
| 2014/0047342 A1* | 2/2014 | Breternitz | G06F 9/5061 715/735 |
| 2014/0201753 A1* | 7/2014 | He | G06F 9/4881 718/104 |
| 2014/0245298 A1* | 8/2014 | Zhou | G06F 9/455 718/1 |
| 2015/0006716 A1* | 1/2015 | Suchter | G06F 9/5038 709/224 |
| 2015/0058843 A1* | 2/2015 | Holler | G06F 9/455 718/1 |
| 2015/0121371 A1* | 4/2015 | Gummaraju | G06F 17/30194 718/1 |
| 2015/0199208 A1* | 7/2015 | Huang | G06F 9/45533 718/1 |
| 2015/0227393 A1* | 8/2015 | Fuller | G06F 9/5011 718/104 |
| 2015/0227394 A1* | 8/2015 | Chin | G06F 9/5066 718/104 |

OTHER PUBLICATIONS

Wang et al. Dynamic Split Model of Resource Utilization in MapReduce, DataCloud-SC'11, Nov. 14, 2011, Seattle, Washington, USA.

Rehmann et al. An In-Memory Framework for Extended MapReduce, 2011 IEEE 17th International Conference on Parallel and Distributed Systems.

Kobayashi et al. The Gfarm File System on Compute Clouds, 2011 IEEE International Parallel & Distributed Processing Symposium.

Ramesh et al. Project Hoover: Auto-Scaling Streaming Map-Reduce Applications, MBDS'12 Proceedings on the 2012 Workshop on Management of Big Data Systems.

Ananthanarayanan et al. True Elasticity in Multi-Tenant Data-Intensive Computer Clusters, SOCC'12, Oct. 14-17, 2012.

Herodotou et al. Starfish: A Self-Tuning System for Big Data Analytics, 5th Biennial Conference on Innovative Data Systems Research (CIDR'11) Jan. 9-11, 2011.

Zaharia et al. Improving MapReduce Performance in Heterogeneous Environments, 8th Usenix Symposium on Operating Systems Design and Implementation, 2008.

Ananthanarayanan et al. Reining in the Outliers in Map-Reduce Clusters using Mantri, 9th USENIX Symposium on Operating Systems Design and Implementation, 2010.

Ananthanarayanan et al. Effective Straggler Mitigation: Attack of the Clones, 10th USENIX Symposium on Networked Systems Design and Implementation, Apr. 2013.

Wikipedia, Apache Hadoop, http://en.wikipedia.org/wiki/Apache_Hadoop, Nov. 15, 2013.

Wikipedia, Platform Symphony, http://en.wikipedia.org/wiki/Symphony_(software), Dec. 5, 2012.

Wikipedia, MapReduce, http://en.wikipedia.org/wiki/MapReduce, Nov. 8, 2013.

Disco MapReduce, http://discoproject.org/, accessed Nov. 15, 2013.

Skynet, A Ruby MapReduce Framework, http://skynet.rubyforge.org/, accessed Nov. 15, 2013.

MapReduce-MPI Library, http://mapreduce.sandia.gov/, accessed Nov. 15, 2013.

U.S. Appl. No. 14/684,350, filed Apr. 11, 2015, entitled: Controlling a Delivery of Messages to Designated Computing Devices.

* cited by examiner

ENABLING DYNAMIC JOB CONFIGURATION IN MAPREDUCE

FIELD OF THE INVENTION

Embodiments of the invention generally relate to information technology, and, more particularly, to MapReduce technology.

BACKGROUND

Existing MapReduce implementations only support static parameter configuration at the job level. However, static job configuration faces multiple challenges in areas of performance, scaling, etc. For example, existing static job configuration approaches face difficulties with tuning performance, as well as leveraging the elasticity of cloud infrastructure in real-time.

Additionally, static job configuration approaches can prohibit solving outlier problems, which significantly degrades MapReduce application performance. Further, resource contentions among multiple jobs in a multi-tenant environment are commonly dynamic, and cannot be resolved by static job configuration.

Accordingly, a need exists for techniques that enable dynamic job configuration in MapReduce.

SUMMARY

In one aspect of the present invention, techniques for enabling dynamic job configuration in MapReduce are provided. An exemplary computer-implemented method can include steps of generating a first set of configurations for a currently executing MapReduce job, wherein said set of configurations comprises job-level configurations and task-level configurations; dynamically modifying configurations associated with a mapper component and/or a reducer component associated with at least one ongoing map task and/or ongoing reduce task of the MapReduce job based on the generated first set of configurations; and deploying said first set of configurations to the mapper component and/or the reducer component associated with the MapReduce job.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for enabling dynamic job configuration in MapReduce. Additionally, another aspect of the present invention includes supporting task-level configurations for each map and reduce task. As further detailed herein, a dynamic fine-grain job configuration mechanism generated and/or implemented in accordance with at least one embodiment of the invention includes enabling dynamic job configurations without interrupting job execution.

Such a mechanism, as also further illustrated herein, can include enacting improvements on single MapReduce job performance, tuning multiple job performance in a multi-tenant environment, and expediting a performance tuning process by reducing the number of test runs through task-level configuration. Also, at least one embodiment of the invention includes elastic scalability, for example, via reconfiguring a MapReduce job based on dynamic resource allocation of a MapReduce cluster in real-time.

Figure 1:
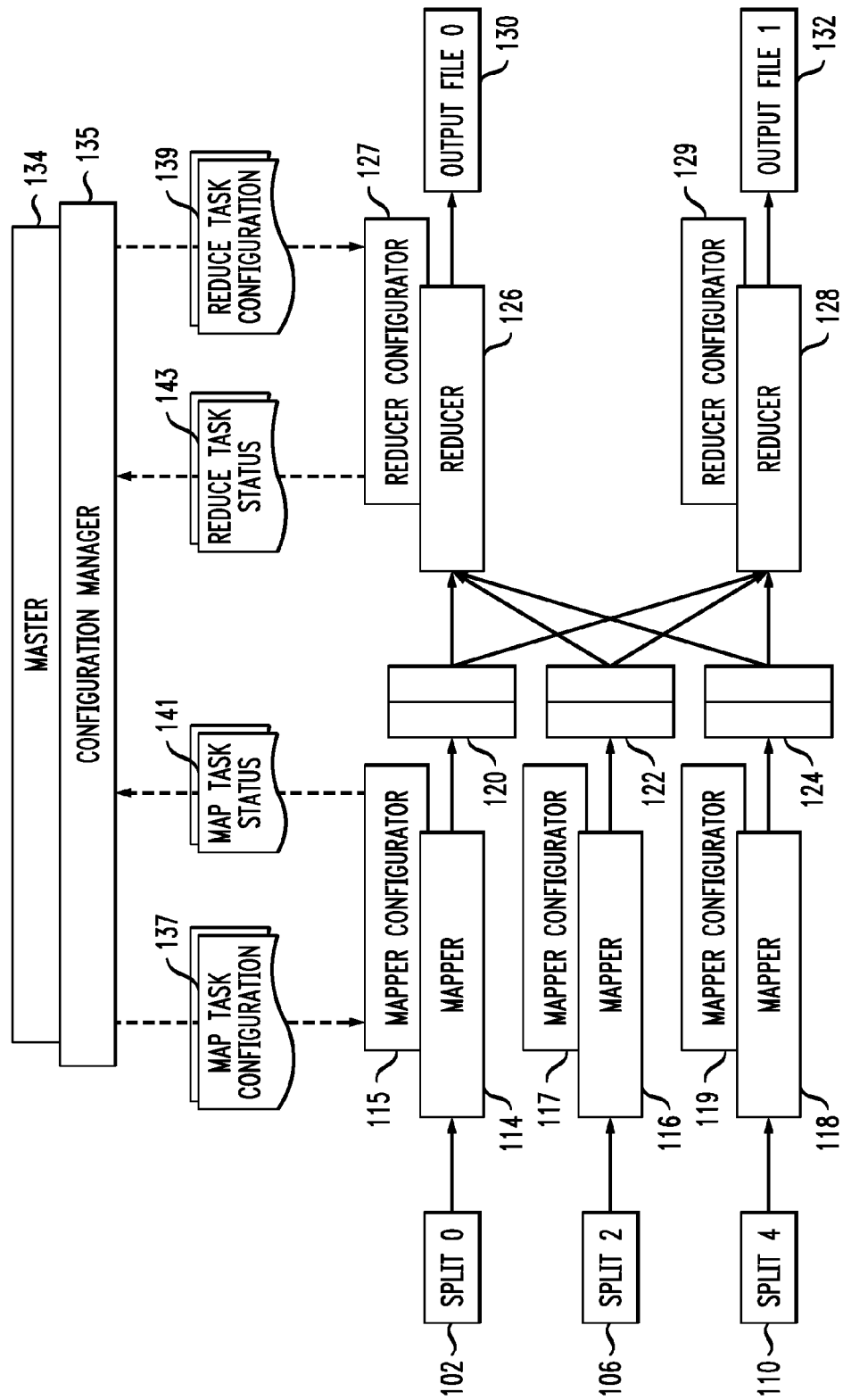
FIG. 1 is a diagram illustrating dynamic task-level configuration, according to an embodiment of the present invention.

FIG. 1 is a diagram illustrating dynamic task-level configuration, according to an embodiment of the present invention. As used herein, a split refers to the size of an input (in the form of a data file, for example). By way of illustration, FIG. 1 depicts split (0) 102, split (2) 106 and split (4) 110. Input size determines the total number of mappers and impacts execution duration of a map task. A smaller input size results in a larger number of mappers, while a larger input size results in a smaller number of mappers. A map task with a smaller input size commonly executes faster than a map task with a larger input size.

Additionally, as depicted in the example embodiment illustrated in FIG. 1, split (0) 102 is allocated to mapper 114, split (2) 106 is allocated to mapper 116, and split (4) 110 is allocated to mapper 118. As also illustrated in FIG. 1, mapper configurators 115, 117 and 119 (corresponding to mappers 114, 116 and 118, respectively) receives new job and/or task configurations 137 from configuration manager 135 and change the corresponding mapper's configuration or use the new configuration to initiate a future mapper. As such, the mapper configurators 115, 117 and 119 can each provide a map task status 141 to the configuration manager 135.

Also, as further depicted in the example embodiment illustrated in FIG. 1, reducers 126 and 128 receive reduce input data via mapper outputs 120, 122 and 124. Such outputs (that is, outputs 120, 122 and 124) are results of a mapper task. Additionally, reducer configurators 127 and 129 (corresponding to reducers 126 and 128, respectively) receives new job and/or task configurations 139 from the configuration manager 135 and change the corresponding reducer's configuration or use the new configuration to initiate a future reducer. Further, the reducer configurators 127 and 129 can each provide a reduce task status 143 to the configuration manager 135.

For each job, the configuration manager 135 (which interacts with the master component 134) generates job configurations (including task-level configurations) and distributes the configurations to mapper configurators (such as components 115, 117 and 119) and reducer configurators (such as components 127 and 129). Generating job configurations can include the use of an event trigger or other third party tuning logic. An event trigger can include low or high CPU utilization, low or high memory utilization, low or high disk input/output (I/O), low or high network I/O, etc. The master component 134 controls the execution of the MapReduce jobs, and the configuration manager component 135 associated with the master component 134 is responsible for checking job execution status, generating new job and/or task configurations and sending new configurations to the mapper configurators and the reducer configurators.

Further, as also depicted by FIG. 1, output data file (0) 130 and output data file (1) 132 are generated and output by reducers 126 and 128, respectively.

Additionally, at least one embodiment of the invention includes implementation of dynamic configuration application programming interfaces (APIs), such as the following:

List<String> getConfigurableJobParameters(JobID jid), which returns the set of parameters which can be changed and become effective for the job whose job identifier (ID) equals "jid," and for whose tasks are currently running or will run in the future;

List<String> getConfigurableTaskParameters(JobID jid, TaskID tid), which returns the set of parameters which can be changed and become effective for the tasks whose job ID equals "jid" and for whose task ID equals "tid," while the rest of the task-level parameters can be effective for future tasks;

int setJobParameters(JobID jid, Map<String,String> kv), which sets the job parameters for the job whose job ID equals "jid," and which returns 0 if success if reaches, and returns −1 if failure is reached;

int setTaskParameters(JobID jid, TaskID tid, Map<String, String>), which sets the task parameters for the task whose job ID equals "jid" and task ID equals "tid," and which returns 0 if success is reached, and returns −1 if failure is reached; and int setTaskParameters(JobID jid, Map<String, String>), which sets the task parameters for all tasks whose job ID equals "jid," and which returns 0 if success is reached, and returns −1 if failure is reached. In at least one embodiment of the invention, the APIs detailed above are associated with the configuration manager component 135.

Figure 2:
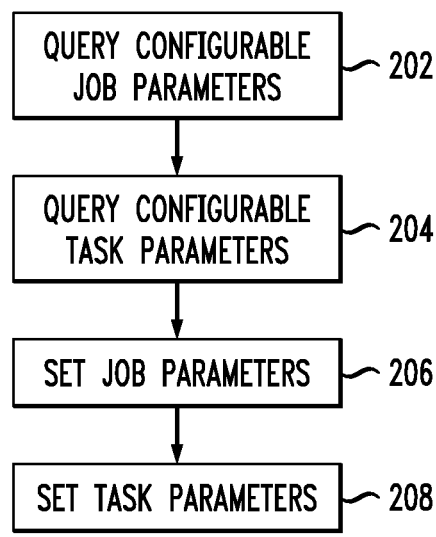
FIG. 2 is a flow diagram illustrating application programming interface (API) invocation, according to an aspect of the invention.

FIG. 2 is a flow diagram illustrating API invocation, according to an aspect of the invention. Step 202 includes querying configurable job parameters. Step 204 includes querying configurable task parameters. As used herein, a job includes a collection of tasks. Step 206 includes setting one or more job parameters. Step 208 includes setting one or more task parameters.

Mapper configuration parameters can include the size of the map task input, resource allocation for mapper, central processing unit (CPU), memory, the size of the sorting area, the number of threads when writing the map output to a local disk, etc. Similarly, reducer configuration parameters can include the number of threads when copying the map output to reducers, the size of the reduce task input, resource allocation of a reduce task, CPU, memory, the size of a sorting area, etc.

Further, in accordance with at least one embodiment of the invention, deployment of new configuration parameters can impact a mapper and/or reducer immediately, or the deployment can impact a future mapper and/or reducer. The type of deployment can be determined, for example, by the type of parameters and/or a relevant task execution status. By way of illustration, consider an example pertaining to size of sorting area. In such an example, if the mapper had not started sorting yet, then a new setting of sorting area size can be deployed immediately. Alternatively, if the mapper had already started sorting, then a new setting of sorting area size can be deployed for future mappers.

Figure 3:
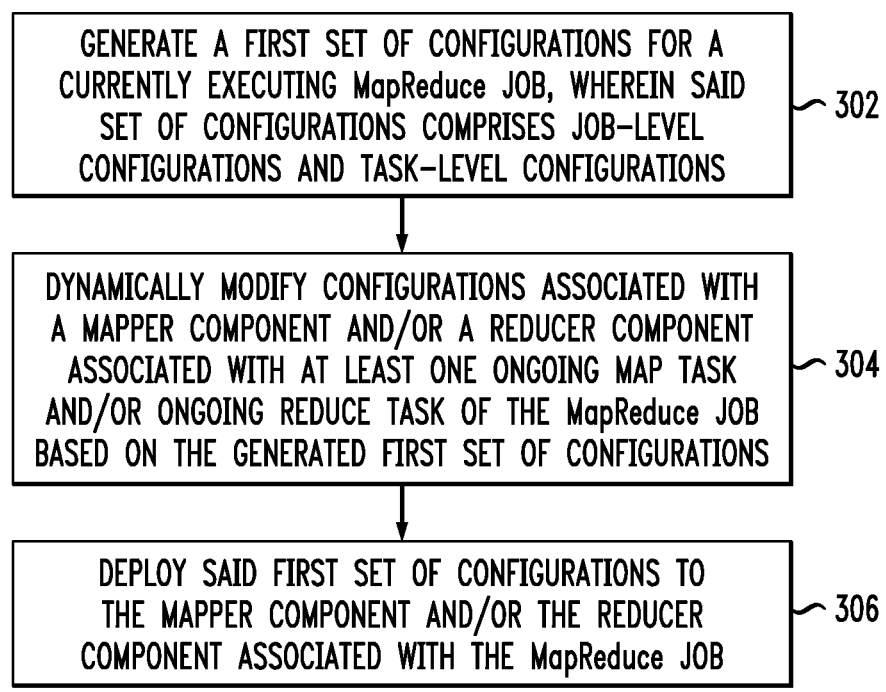
FIG. 3 is a flow diagram illustrating techniques according to an embodiment of the invention.

FIG. 3 is a flow diagram illustrating techniques according to an embodiment of the present invention. Step 302 includes generating a first set of configurations for a currently executing MapReduce job, wherein said set of configurations comprises job-level configurations and task-level configurations. Generating a set of configurations can include periodically generating a new set of configurations for the MapReduce job. Further, at least one embodiment of the invention includes preceding step 302 by generating the job and/or task parameter values that can subsequently be changed and become effective under a run-time status. By way of example, such functionality can be implemented by a first and second API, as further detailed herein.

Step 304 includes dynamically modifying configurations associated with a mapper and/or a reducer based on the generated first set of configurations. Dynamically modifying configurations can include dynamically modifying an existing set of configurations associated with the mapper component based on the generated set of configurations. Additionally, dynamically modifying can include initiating a future mapper component associated with the MapReduce job based on the generated set of configurations. Dynamically modifying can also include dynamically modifying an existing set of configurations associated with the reducer component based on the generated set of configurations. Further, dynamically modifying can include initiating a future reducer component associated with the MapReduce job based on the generated set of configurations.

Additionally, dynamically modifying can include dynamically modifying configurations associated with multiple mapper components and/or multiple reducer components associated with the MapReduce job based on the generated set of configurations. The multiple mapper components and/or multiple reducer components can include multiple heterogeneous mapper components and/or multiple heterogeneous reducer components.

Step 306 includes deploying said first set of configurations to the mapper component and/or the reducer component associated with the MapReduce job. Deploying can include deploying said modified configurations to the mapper component and/or the reducer component without interrupting task execution by the mapper component and/or the reducer component. Additionally, deploying can include deploying said modified configurations based on type of parameters encompassed by the modified configurations and/or based on a task execution status associated with the mapper component and/or the reducer component. Deploying can include deploying said modified configurations for mapper and reducers to be launched in the future.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
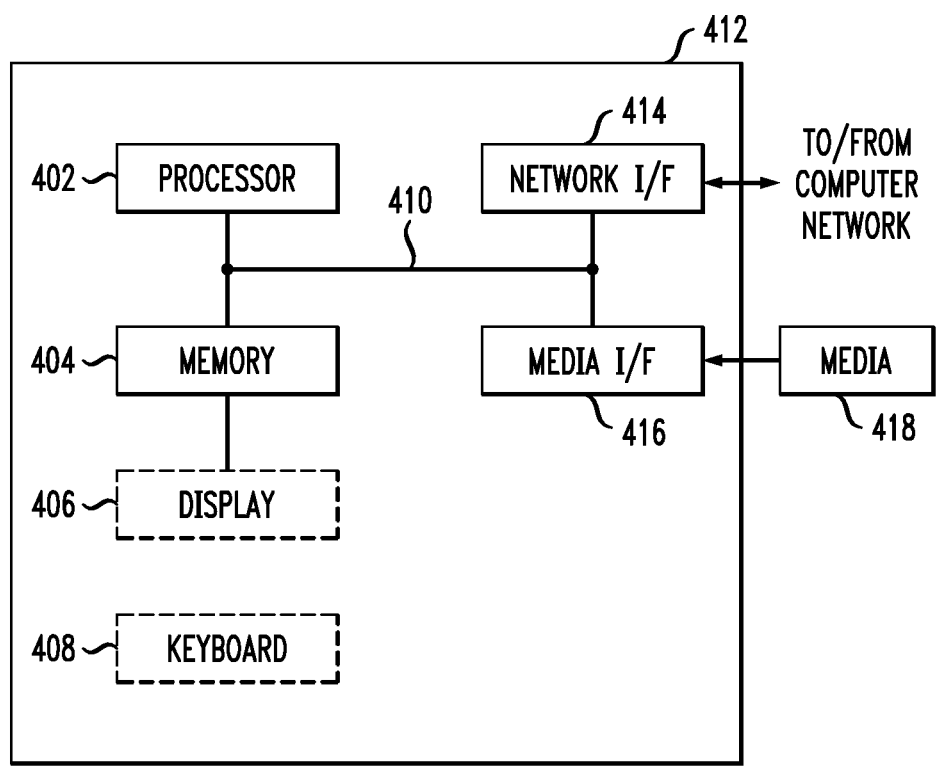
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, scheduling changes required to accommodate outliers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating a first set of configurations for a currently executing MapReduce job, wherein said set of configurations comprises job-level configurations and task-level configurations;
dynamically modifying: (i) a distinct set of task-level configurations of a mapper component associated with at least one ongoing map task of the MapReduce job, based on the generated first set of configurations, wherein said task-level configurations of the mapper component comprise a size of a map task input, resource allocation for a mapper component, central processing unit, memory, a size of a sorting area, and a number of threads when writing a map output to a local disk, and (ii) a distinct set of task-level configurations of a reducer component associated with at least one ongoing reduce task of the MapReduce job, based on the generated first set of configurations, wherein said task-level configurations of the reducer component comprise a number of threads when copying a map output to a reducer component, a size of a reduce task input, resource allocation of a reduce task, central processing unit, memory, and a size of a sorting area; and deploying said modified configurations to the mapper component and the reducer component associated with the MapReduce job in accordance with one of multiple temporal deployment schedules, wherein the temporal deployment schedule is based on the contents of the modified configurations;

wherein said generating, said modifying, and said deploying are carried out by one or more computing devices.

2. The method of claim 1, comprising:
generating a set of job and/or task configuration parameter values that can be changed and rendered effective under a run-time status.

3. The method of claim 1, wherein said generating comprises periodically generating a new set of configurations for the MapReduce job.

4. The method of claim 1, wherein said dynamically modifying comprises dynamically modifying an existing set of configurations associated with the mapper component based on the generated set of configurations.

5. The method of claim 1, wherein said dynamically modifying comprises initiating a future mapper component associated with the MapReduce job based on the generated set of configurations.

6. The method of claim 1, wherein said dynamically modifying comprises dynamically modifying an existing set of configurations associated with the reducer component based on the generated set of configurations.

7. The method of claim 1, wherein said dynamically modifying comprises initiating a future reducer component associated with the MapReduce job based on the generated set of configurations.

8. The method of claim 1, wherein said dynamically modifying comprises dynamically modifying configurations associated with multiple mapper components and/or multiple reducer components associated with the MapReduce job based on the generated set of configurations.

9. The method of claim 8, wherein said multiple mapper components and/or multiple reducer components comprise multiple heterogeneous mapper components and/or multiple heterogeneous reducer components.

10. The method of claim 1, wherein said deploying comprises deploying said modified configurations to the mapper component and/or the reducer component without interrupting task execution by the mapper component and/or the reducer component.

11. The method of claim 1, wherein said deploying comprises deploying said modified configurations based on type of parameters encompassed by the modified configurations.

12. The method of 1, wherein said deploying comprises deploying said modified configurations based on a task execution status associated with the mapper component and/or the reducer component.

13. An article of manufacture comprising a non-transitory computer readable storage medium having computer readable instructions tangibly embodied thereon which, when implemented, cause a computer to carry out a plurality of method steps comprising:

generating a first set of configurations for a currently executing MapReduce job, wherein said set of configurations comprises job-level configurations and task-level configurations;

dynamically modifying: (i) a distinct set of task-level configurations of a mapper component associated with at least one ongoing map task of the MapReduce job, based on the generated first set of configurations, wherein said task-level configurations of the mapper component comprise a size of a map task input, resource allocation for a mapper component, central processing unit, memory, a size of a sorting area, and a number of threads when writing a map output to a local disk, and (ii) a distinct set of task-level configurations of a reducer component associated with at least one ongoing reduce task of the MapReduce job, based on the generated first set of configurations, wherein said task-level configurations of the reducer component comprise a number of threads when copying a map output to a reducer component, a size of a reduce task input, resource allocation of a reduce task, central processing unit, memory, and a size of a sorting area; and deploying said modified configurations to the mapper component and the reducer component associated with the MapReduce job in accordance with one of multiple temporal deployment schedules, wherein the temporal deployment schedule is based on the contents of the modified configurations.

14. The article of manufacture of claim 13, wherein said dynamically modifying comprises dynamically modifying an existing set of configurations associated with the mapper component based on the generated set of configurations.

15. The article of manufacture of claim 13, wherein said dynamically modifying comprises initiating a future mapper component associated with the MapReduce job based on the generated set of configurations.

16. The article of manufacture of claim 13, wherein said dynamically modifying comprises dynamically modifying an existing set of configurations associated with the reducer component based on the generated set of configurations.

17. The article of manufacture of claim 13, wherein said dynamically modifying comprises initiating a future reducer component associated with the MapReduce job based on the generated set of configurations.

18. A system comprising:
at least one memory; and
at least one processor coupled to the at least one memory and configured for:

generating a first set of configurations for a currently executing MapReduce job, wherein said set of configurations comprises job-level configurations and task-level configurations;

dynamically modifying: (i) a distinct set of task-level configurations of a mapper component associated with at least one ongoing map task of the MapReduce job, based on the generated first set of configurations, wherein said task-level configurations of the mapper component comprise a size of a map task input, resource allocation for a mapper component, central processing unit, memory, a size of a sorting area, and a number of threads when writing a map output to a local disk, and (ii) a distinct set of task-level configurations of a reducer component associated with at least one ongoing reduce task of the MapReduce job, based on the generated first set of configurations, wherein said task-level configurations of the reducer component comprise a number of threads when copying a map output to a reducer component, a size of a reduce task input, resource allocation of a reduce task, central processing unit, memory, and a size of a sorting area; and deploying said modified configurations to the mapper component and the reducer component associated with the MapReduce job in accordance with one of multiple temporal deployment schedules, wherein the temporal deployment schedule is based on the contents of the modified configurations.

\* \* \* \* \*